(12) United States Patent
Teittinen

(10) Patent No.: US 9,189,852 B2
(45) Date of Patent: Nov. 17, 2015

(54) METHOD FOR MANUALLY ALIGNING TWO DIGITAL IMAGES ON MOBILE DEVICES

(75) Inventor: Marko A. Teittinen, San Jose, CA (US)

(73) Assignee: Google Inc., Mountain View, CA (US)

( * ) Notice: Subject to any disclaimer, the term of this patent is extended or adjusted under 35 U.S.C. 154(b) by 423 days.

(21) Appl. No.: 13/364,631

(22) Filed: Feb. 2, 2012

(65) Prior Publication Data

US 2015/0154754 A1 Jun. 4, 2015

(51) Int. Cl.
  *G09G 5/377* (2006.01)
  *G06T 7/00* (2006.01)
  *G09G 5/14* (2006.01)

(52) U.S. Cl.
  CPC .............. *G06T 7/0024* (2013.01); *G09G 5/14* (2013.01); *G09G 5/377* (2013.01); *G06T 2207/10004* (2013.01); *G09G 2340/10* (2013.01); *G09G 2340/12* (2013.01); *G09G 2354/00* (2013.01)

(58) Field of Classification Search
  CPC .......... H04N 13/0239; H04N 13/0275; H04N 13/0011; H04N 13/0029; H04N 13/0022; H04N 13/004; G11B 7/24079; G11B 2220/2541; G11B 27/322
  USPC ........................................................ 345/634
  See application file for complete search history.

(56) References Cited

U.S. PATENT DOCUMENTS

| 8,675,019 | B1 * | 3/2014 | Feinstein | 345/634 |
| 2008/0291205 | A1 * | 11/2008 | Rasmussen et al. | 345/441 |
| 2009/0316951 | A1 * | 12/2009 | Soderstrom | 382/103 |
| 2011/0057948 | A1 * | 3/2011 | Witt et al. | 345/593 |
| 2011/0302532 | A1 * | 12/2011 | Missig | 715/823 |
| 2012/0240037 | A1 * | 9/2012 | Migos et al. | 715/255 |

OTHER PUBLICATIONS

Web Page—http://www.appolicious.com—GPS on all maps—Maprika put "you are here" sign on any map.
http://www.appolicious.com—AppoliciousTM iPhone and iPad App Director.
http://www.opalevents.org—Opal Events—Your Source for Superior Events.
http://www.adobe.com—Photo Editing Programs—Adobe Photoshop Family.
http://www.kenrockwell.com—Canon Panoramic Software—Canon photoStitch Software.

* cited by examiner

*Primary Examiner* — Mark Zimmerman
*Assistant Examiner* — F. M. Hossain
(74) *Attorney, Agent, or Firm* — Lerner, David, Littenberg, Krumholz & Mentlik, LLP

(57) ABSTRACT

Systems and methods of aligning two digital images using a user interface on a device that includes an electronic circuit and a display screen are disclosed. The electronic circuit displays a first image on the display screen and receives a selection of a first reference point on the first image from the user interface. The electronic circuit generates a snippet image that is a partially transparent square portion of the user map image centered on the first reference point. The electronic circuit overlays the snippet image on a second image on the display screen, such that the second image is visible through the snippet image. The electronic circuit receives a selection of a second reference point on the second image corresponding to the first reference point on the first image from the user interface and an indication of acceptable alignment of the two digital images.

19 Claims, 3 Drawing Sheets

METHOD FOR MANUALLY ALIGNING TWO DIGITAL IMAGES ON MOBILE DEVICES

BACKGROUND

1. Statement of the Technical Field

Embodiments concern aligning two digital images, such as photos or maps, using a mobile device having a limited display area.

2. Description of the Related Art

There are several systems and methods available for aligning two images on a computing device. One example is Canon's PhotoStitch application which allows a user to "stitch" multiple images together to form a single, large size picture. The application merges two or more digital photographs allowing the user to select a point in one digital photo and drag a little thumbnail of the surrounding pixels over to another photo and line up the corresponding image features. This application was designed for use with Canon's digital camera line and is primarily used to create panoramic shots from separately shot images taken using camera functions such as Canon's Stitch Assist mode. This method works well when used on images taken from a similar, if not the same, orientation and zoom level. However this method fails to locate a general match where two images may have significantly different orientation or zoom level. Additionally, Canon's method is not suitable for use on small screens, such as those for smart phones and other small mobile devices.

Another method is utilized by the Maprika smart phone application. A user selects a point on a map image and a corresponding point on a digital map to geo-locate the map image. The application provides a user with a fixed target selection pattern and allows user manipulation of a first image behind the fixed target selection pattern by zooming and panning the first image. An inset frame in the corner of the screen shows the corresponding location in a second image. For example, if the user is picking a point on a user map image, it shows the selected digital map point. Conversely, if the user is selecting a digital map point, the inset shows the selected point on the map image. This approach has two drawbacks. First the user is required to switch between two point selection modes, one for the first image and one for the second image, which may look the same adding to user confusion. Second the user must compare the similarity of the location between the two images by referring to the main screen and an offset frame in the corner screen, which makes it more difficult to accurately match up relevant points on the two images.

Also, desktop image manipulation software may be used to align two digital images. Applications such as Adobe Photoshop allow users to create images that consist of multiple layers. A user may zoom, pan, and rotate each layer independently to align the images on each layer. The layer that is manipulated is usually selected from a separate menu outside the window displaying the layered image. A drawback to this approach is that it is often difficult to see which layer is selected when looking only at the image. This can result in accidental manipulation of the incorrect layer requiring the user to undo the changes and start again. This approach also requires the extra selection mechanism to select the layer to be manipulated, making it less than ideal for smaller screen devices.

Therefore, there is a need to develop a method of aligning digital images that overcomes the drawbacks of the above detailed methods. The need is especially great in the field of smart phones and other small mobile communications devices where screen real estate and ease of use are at a premium.

SUMMARY

Systems and methods of aligning two digital images using a user interface on a device that includes an electronic circuit and a display screen are disclosed. The electronic circuit displays a first image on the display screen and receives a selection of a first reference point on the first image from the user interface. The electronic circuit generates a snippet image that is a partially transparent square portion of the user map image centered on the first reference point. The electronic circuit overlays the snippet image on a second image on the display screen, such that the second image is visible through the snippet image. The electronic circuit receives a selection of a second reference point on the second image corresponding to the first reference point on the first image from the user interface and an indication of acceptable alignment of the two digital images.

The selection of the second reference point on the second image may be accomplished by the user moving the second image through the user interface to align the second point with the first point and indicating alignment using the user interface. Alternatively, the user may move the snippet image using independent controls on the user interface to align the first point with the second point. Movement of the second image and/or the snippet image may be rotational or translation, i.e. along the vertical or horizontal axis. Also, the second image and/or snippet image may be scaled size, such as for size matching.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
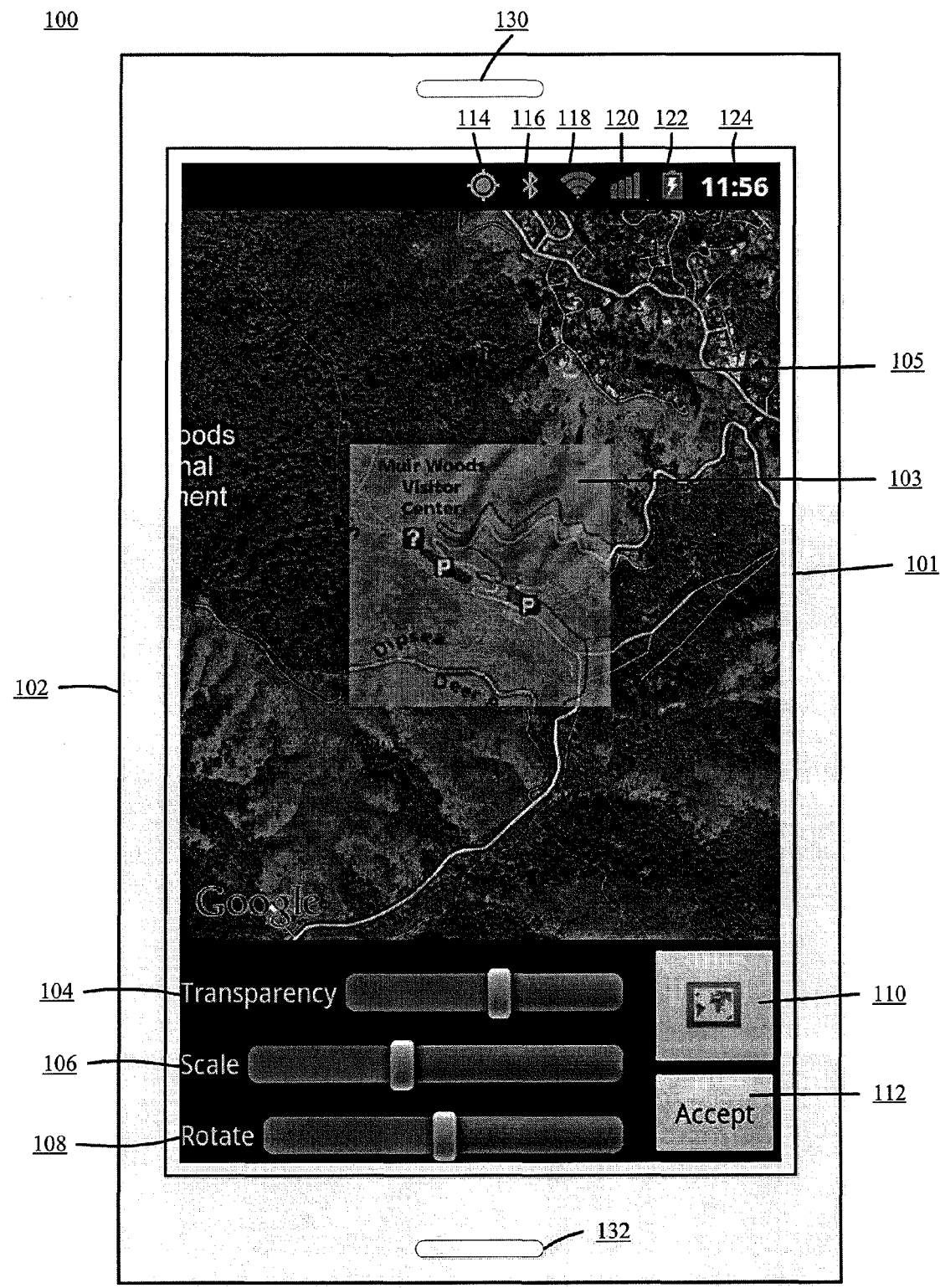
FIG. 1 is a block diagram of an exemplary system.

Example implementations of the present invention are described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Implementations may be deployed on small mobile devices that include a touch screen, e.g. a smart phone. Other implementations may include tablets, personal computers, and the like. The embodiments of the invention are not limited in this regard.

One exemplary usage is aligning a map to an aerial photograph or another map of the same area. A user would first size and orientate one of the images, selecting a point. Next, the application stores a small bitmap centered on the selected point, the bitmap comprising a "snippet" image. This snippet image is then overlaid with the second image, with the snippet effectively acting as a semi-transparent crosshairs through which the second image is viewed. Another aspect of the invention is that the snippet and the second image may then be manipulated using separate user interface controls. For example, the second image may be controlled by "normal" touch screen controls, whereas the snippet may be controlled by separate scrollbars and/or other user interface controls that are displayed below or alongside the image area. Various application of the alignment are envisioned, including aligning map images to digital maps and aligning multiple photographs taken of a single target.

In one implementation, the two images may be a user map image—i.e. an image file created or loaded onto a device by the user—and a satellite digital map image retrieved from any known internet mapping source, for example, Google Maps™. The satellite digital map may also contain or may be cross-referenced to geographic coordinates (such as global positioning system ("GPS") coordinates) to allow applications running on the device to geo-locate the device, i.e. the user, on the satellite digital map. One advantage of aligning the user map image with a digital map image retrieved from an internet server is the ability to geo-locate the user, using the GPS capabilities of the device, on the user map which may not contain the preprogrammed GPS coordinates.

Exemplary implementing systems will be described below in relation to FIGS. 1 and 2. Exemplary implementing methods will be described below in relation to FIG. 3.
Exemplary Systems Referring now to FIG. 1, there is provided a block diagram of an exemplary system 100 that is useful for understanding various implementations. The system 100 comprises a computing device ("user device") 102 that comprises main display screen 101. The system 100 may include more, less or different components than those illustrated in FIG. 1. For example, in implementations the main display screen 101 may be a touch screen, computer monitor, television, or other display device capable of displaying images that are to be aligned. The user device 102 may be a personal computer, laptop/notebook computer, and the like. Further, the interface of user device 102 may comprise a touch screen, mouse, stylus, and/or other human interface devices. For illustrative purposes, user device 102 also includes speaker 130 and microphone 132 and may include more, less, or different components that those illustrated in FIG. 1. However, the components shown are sufficient to disclose an illustrative inventive embodiment.

In an implementation, main display 101 of user device 102 displays an image which may include system and/or application specific elements. Referring again to FIG. 1, main display 101 includes a notification bar across the top that includes a number of notification symbols 114-124. This notification bar includes a global positioning system ("GPS") tracking notification symbol 114, a Bluetooth notification symbol 116, a WiFi notification symbol 118, a mobile network signal strength notification symbol 120, a battery charge status notification symbol 122, and a clock 124.

FIG. 1 also includes application specific elements. In one implementation, the application is a mapping application that allows the user to manually align a snippet image 103 of a map with a known digital map 105 (shown here as satellite view with roads and other overlays). This allows for tracking of user location on a locally stored image that can be used to augment (or replace) the information provided on the digital map 105 with the information on the local image and for user location tracking when a mobile data connection is not available. Although the application elements included in FIG. 1 will be described in reference to this implementation, other implementations are not limited in this regard.

Referring again to FIG. 1, the application display includes user interface controls 104-112. These controls include a transparency control 104 that controls the transparency of the snippet image 103, a scale control 106 that controls the scale—i.e. magnification—of the snippet image 103, and a rotate control 108 that controls the right and left rotation of the snippet image 103. Manipulation controls 104, 106, and 108 allow the user to manipulate and match the snippet image 103 separately from the main display image—e.g. the digital map image 105. User device 102 is configured to respond to touch inputs directed to digital map image 105 to pan, scale, and rotate digital map image 105. For example, in response to a touch and drag gesture, digital map image 105 may be panned. A pinch gesture may zoom map 105 in or out, while a two-finger input followed by rotation may rotate digital map image 105.

Other controls shown on FIG. 1 include a switch image button 110 that allows for switching between different digital map images 105, such as switching from satellite imagery to a road map as the background over which the snippet is aligned, and accept button 112 that locks the user image match.

Figure 2:
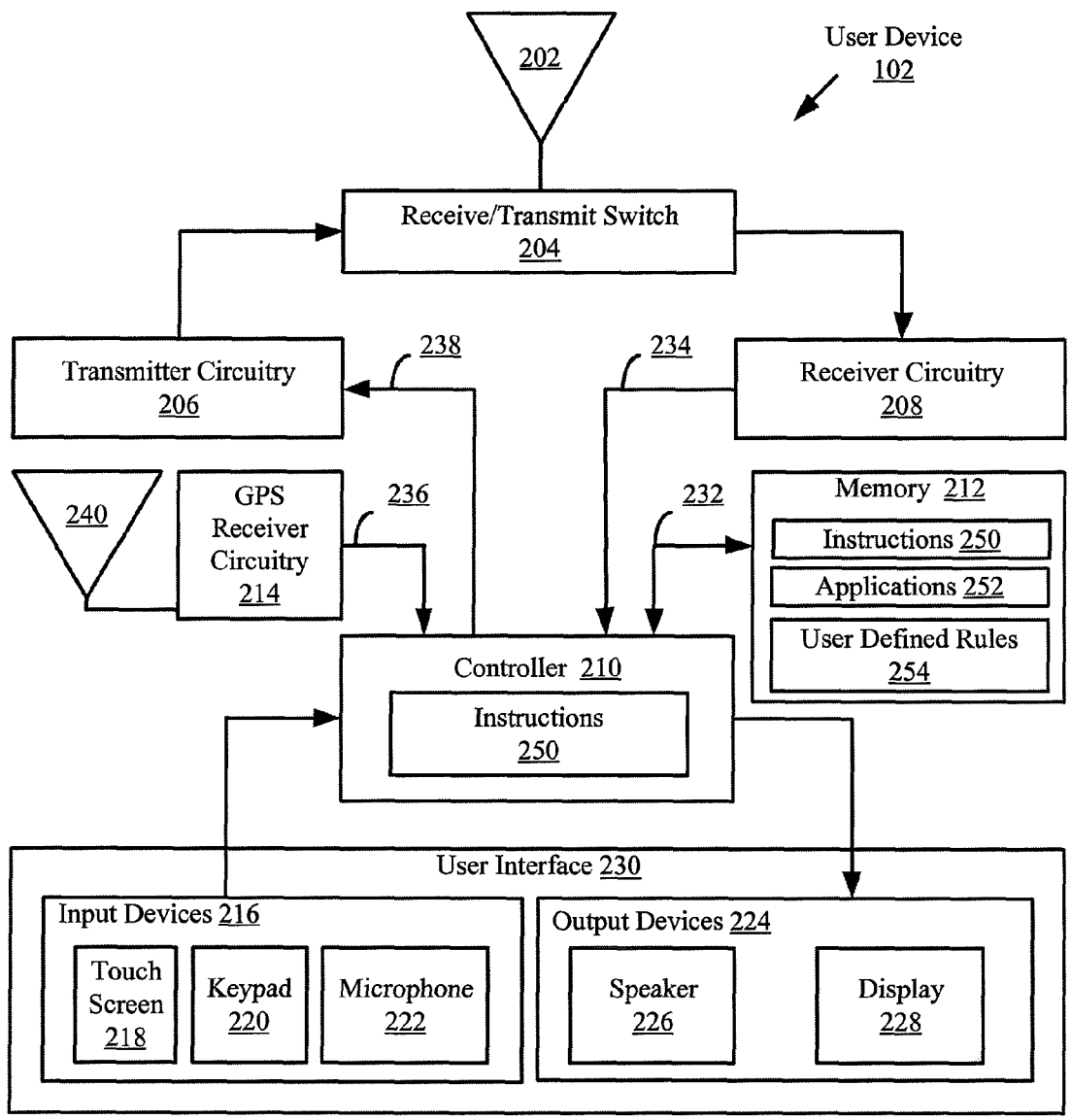
FIG. 2 is a block diagram of an exemplary user device.

Referring now to FIG. 2, there is provided a more detailed block diagram of an exemplary user device 102. The user device 102 will be described herein as comprising a mobile phone or a smart phone. However, the present invention is not limited in this regard. For example, the user device can alternatively comprise a notebook or laptop computer, a PDA, a tablet Personal Computer ("PC"), or the like.

Notably, the user device 102 can include more or less components than those shown in FIG. 2. For example, the user device 102 may include a wired system interface, such as a universal serial bus interface (not shown in FIG. 2). However, the components shown are sufficient to disclose an illustrative embodiment. The hardware architecture of FIG. 2 represents one embodiment of a representative user device configured to facilitate the manual alignment of two images. In this regard, the user device of FIG. 2 implements a method for manually aligning two images for use by the user of user device 102. Exemplary embodiments of the various methods will be described below in relation to FIG. 3.

As shown in FIG. 2, the user device 102 may also comprise an antenna 202 for receiving and transmitting Radio Frequency (RF) signals. A receive/transmit (Rx/Tx) switch 204 selectively couples the antenna 202 to the transmitter circuitry 206 and receiver circuitry 208 in a manner familiar to those skilled in the art. The receiver circuitry 208 demodulates and decodes the RF signals received from a network (not depicted in FIG. 2) to derive information therefrom. The receiver circuitry 208 is coupled to a controller 210 via an electrical connection 234. The receiver circuitry 208 provides the decoded RF signal information to the controller 210. The controller 210 also provides information to the transmitter circuitry 206 for encoding and modulating information into RF signals. Accordingly, the controller 210 is coupled to the transmitter circuitry 206 via an electrical connection 238. The transmitter circuitry 206 communicates the RF signals to the antenna 202 for transmission to an external device (not depicted in FIG. 2).

In GPS-enabled implementations, an antenna 240 is coupled to GPS receiver circuitry 214 for receiving GPS signals. The GPS receiver circuitry 214 demodulates and decodes the GPS signals to extract GPS location information therefrom. The GPS location information indicates the location of the user device 102. The GPS receiver circuitry 214 provides the decoded GPS location information to the controller 210. As such, the GPS receiver circuitry 214 is coupled to the controller 210 via an electrical connection 236. Notably, the present invention is not limited to GPS based methods for determining a location of the user device 102. Other methods for determining a location of a user device 102 can be used with the present invention without limitation.

The controller 210 stores the decoded RF signal information and the decoded GPS location information in a memory 212 of the user device 102. Accordingly, the memory 212 is connected to and accessible by the controller 210 through an electrical connection 232. The memory 212 can be a volatile memory and/or a non-volatile memory. For example, the memory 212 can include, but is not limited to, a Random Access Memory (RAM), a Dynamic Random Access Memory (DRAM), a Static Random Access Memory (SRAM), Read-Only Memory (ROM) and flash memory. The memory 212 can also have stored therein the software applications 252 for implementing the methods of embodiments of the invention as well as user-defined rules 254.

Various implementations allow for other means of providing location information to be written into memory 212. For example, a user 110 may directly provide the location information by direct input to a user interface on the user device (not depicted), as is well understood by designers of user interfaces for user devices. Similarly, other methods of establishing the position of the user device 102 may be employed, such as by triangulation of communication signals from known locations/towers, and the like. It is not critical that the user device 102 be GPS-enabled or even include communication features such as provided by antenna 202 and receive/transmit switch 204, although an exemplary user device 102 usually would include these features.

The software applications 252 may include, but are not limited to, applications operative to perform the various methods described herein, as well as applications that allow for custom map generation, image manipulation, and the like.

As shown in FIG. 2, one or more sets of instructions 250 are stored in the memory 212. The instructions 250 can also reside, completely or at least partially, within the controller 210 during execution thereof by the communication device 102. In this regard, the memory 212 and the controller 210 can constitute machine-readable media. The term "machine-readable media", as used here, refers to a single non-transient medium or multiple non-transient media that store the one or more sets of instructions 250. The term "machine-readable media", as used here, also refers to any medium that is capable of storing, encoding or carrying the set of instructions 250 for execution by the communication device 102 and that cause the communication device 102 to perform one or more of the methodologies of the present disclosure.

The controller 210 is also connected to a user interface 230. The user interface 230 is comprised of input devices 216, output devices 224, and software routines (not shown in FIG. 2) configured to allow a user to interact with and control software applications 252 installed on the computing device 102. Software applications 252 may, for example, provide for the use of other positioning technologies in addition to or instead of GPS, such as, but not limited to other satellite-based positioning systems or other techniques such as IP geolocation, or the like. Such input and output devices may respectively include, but are not limited to, a display 228, a speaker 226, a keypad 220, a microphone 222, and touch screen 218. The input and output devices may include less, more, or different devices including a directional pad, a directional knob, a Push-To-Talk ("PTT") button, sensors, a camera and a Radio Frequency Identification ("RFID")/Near Field Communication ("NFC") reader.

As noted above, the system 100 implements methods aligning two digital images. Exemplary embodiments of such methods will now be described in relation to FIG. 3.

Exemplary Methods

Figure 3:
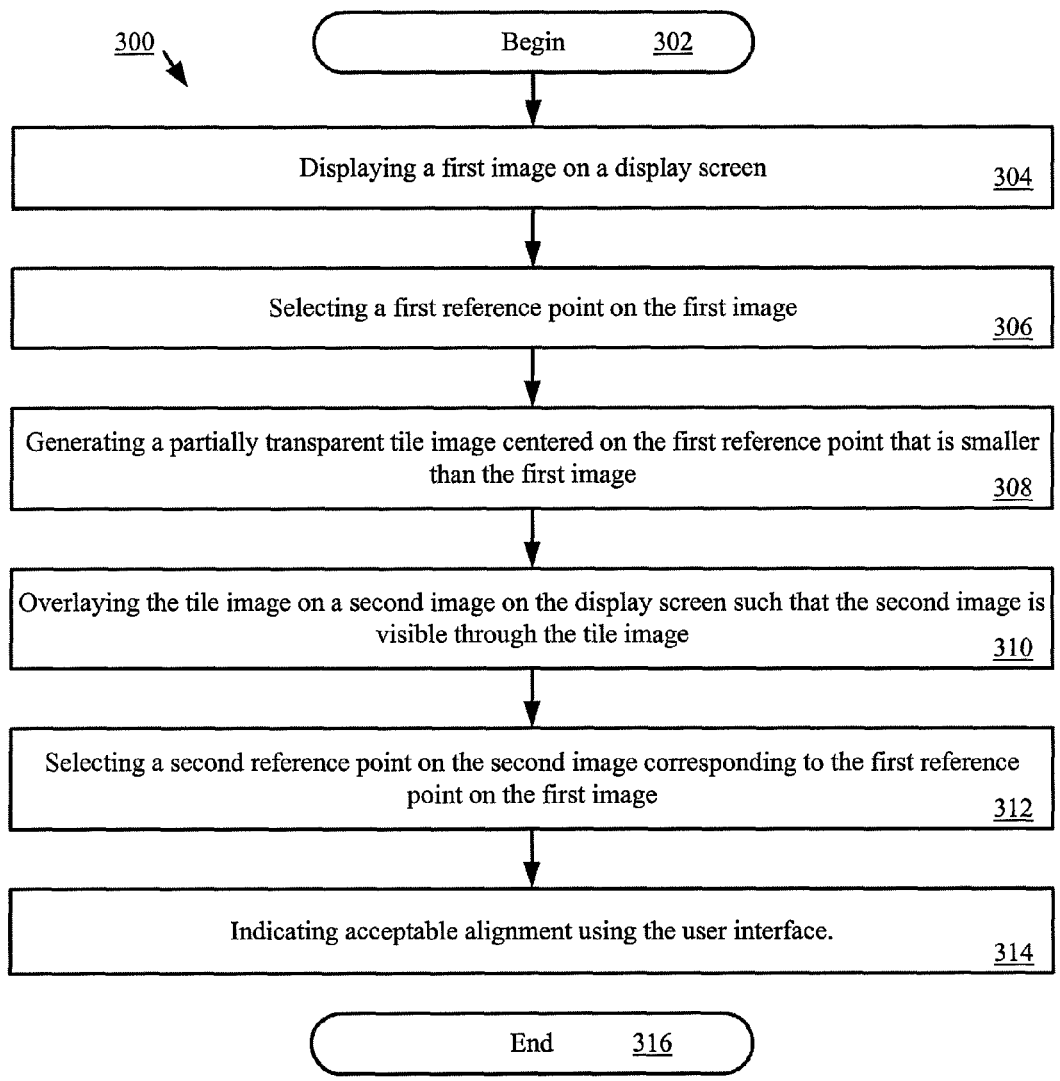
FIG. 3 is a flow diagram of an exemplary method for aligning two digital images.

Referring now to FIG. 3, there is provided a flow diagram of an exemplary method 300 for aligning two digital images. The methods herein will generally be described in a mobile phone or smart phone context. The present invention is not limited in this regard. The method 300 may use other or additional devices, such as notebook or laptop computer, a desktop portable computer, a PDA, tablet, or the like. In particular, a user may employ a desktop or tablet computer to select images to be combined—for example a map image for a national park and a satellite image available from a mapping application—and use a mobile GPS-enabled device, such as a smart phone to manually align the images while in the park.

As shown in FIG. 3, the method 300 begins with step 302 and continues with step 304. In step 304, a first image is displayed on main display screen 101 by an electronic circuit of the user device 102. The first image may be, for example, a user-generated map or an image of a map obtained by the user, such as a map of a national park the user will be visiting. As noted above, implementations are not limited to mapping applications, however, and the first image may be any image which the user would wish to align with a second image.

Next, the user device 102, through the electronic circuit, receives a selection of a first reference point on the first image, as shown by step 306. The user selects a point on the image that will match a point on the second image for the purposes of aligning the two images. The point may be any point on the first image.

The selection of a first reference point on the first image by the user is then used by the user device 102 to generate, in step 308, a partially transparent bitmap image centered on the first reference point. The bitmap image may be smaller than the first image, corresponding to a "snippet" of the first image.

The snippet image is then overlaid on a second image on the display screen in step 310. As noted above, the snippet image can be partially transparent, allowing the second image to be visible through the snippet image. The second image may be any image which the user desires to align with the first image. In one implementation, the second image is a satellite digital map including the geographic area containing the same national park as is represented in the first image. The satellite digital map may be a map retrieved by the user device 102 from any known internet mapping source, for example, Google Maps™. The satellite digital image may also contain or may be cross-referenced to preprogrammed geographic coordinates (such as GPS coordinates) to allow applications running on user device 102 to geo-locate the device, i.e. the user, on the satellite digital map. One advantage of aligning the user map image with a digital map image retrieved from an internet server is the ability to geo-locate the device, using the GPS capabilities of a GPS-enabled user device 102, on the user map which may not contain the preprogrammed GPS coordinates.

For example, by cross referencing points on the first image to known geographic coordinates in the second image, the first image can be scaled/rotated accordingly and used to display the user's location on the first image. As a particular example, the user's position can be shown relative to features in the national park as depicted in the national park map after the national park map is cross-referenced to existing geographic coordinates based on reference points indicated by the user.

Turning back to FIG. 3, once the snippet image is overlaid on the second image, the method 300 continues to step 312 where the electronic circuit receives a selection of a second reference point on the second image. This second reference point corresponds to the first reference point on the first image and is used by the user to manually align the images.

There are a number of methods that may be used to align the first and second images in step 312. In one implementation, the user moves the second image to align the second reference point with the first reference point. The second image may be moved, manipulated, translated, zoomed, panned, and/or rotated using any known user interface technique, such as a multi-finger zooming and panning method utilized on touch screens. For example, the snippet image may be overlaid on a map, with the snippet image remaining centered onscreen while the map is panned, zoomed, or rotated in response to touch inputs directed to the map. The snippet may be zoomed or rotated in response to input directed to separate controls, such as the manipulation controls 104, 106, and 108 (shown on FIG. 1). Alternatively, the snippet image may be manipulated, translated, zoomed, panned, and/or rotated using any known user interface technique. The user may then indicate alignment using the user interface, as shown in step 314. The process may then terminate 316, or additional steps (not depicted) may take place.

Having thus described the invention of the present application in detail and by reference to illustrative embodiments thereof, it will be apparent that modifications and variations are possible without departing from the scope of the invention defined in the appended claims.

What is claimed is:

1. A method of aligning two images, the method comprising:
    displaying, by one or more electronic circuits of a device, a first image using a display screen of the device;
    receiving, by the one or more electronic circuits, a selection of a first reference point on said first image, using a user interface of the device;
    generating, by the one or more electronic circuits, a partially transparent snippet image, wherein the partially transparent snippet image is centered on said first reference point and said partially transparent snippet image is smaller than said first image;
    overlaying, by the one or more electronic circuits, said partially transparent snippet image on a second image on said display screen such that said second image is visible through said partially transparent snippet image;
    receiving, by the one or more electronic circuits, a selection of a second reference point on said second image corresponding to said first reference point on said first image, using said user interface; and
    aligning, by the one or more electronic circuits, said partially transparent snippet image and said second image by aligning said first reference point and said second reference point.

2. The method according to claim 1, wherein aligning comprises:
    moving said second image to align said first reference point and said second reference point in response to one or more touch inputs directed to the second image.

3. The method according to claim 2, further comprising:
    displaying at least one user interface element to control a manipulation of the partially transparent snippet image separate from a manipulation of the second image.

4. The method according to claim 3, further comprising changing a transparency, a scale, or a rotation of the partially transparent snippet image in response to an input directed to the at least one user interface element.

5. The method according to claim 2, wherein the moving comprises translation and rotation of said second image.

6. The method according to claim 1, wherein said user interface comprises a touch screen.

7. The method according to claim 1, wherein the second image comprises a map or satellite imagery of a geographic area.

8. The method of claim 1, further comprising:
    tracking a user location on the first image using information on the second image, wherein the first image is a user map image and the second image is a digital map image.

9. A system, comprising a user interface;
    a display screen; and
    at least one electronic circuit configured to perform the following operations:
    displaying, by said at least one electronic circuit, a first image using said display screen,
    receiving, by said at least one electronic circuit, a selection of a first reference point on said first image, using said user interface,
    generating, by said at least one electronic circuit, a partially transparent snippet image, wherein said partially transparent snippet image is centered on said first reference point and said partially transparent snippet image is smaller than said first image,
    overlaying, by said at least one electronic circuit, said partially transparent snippet image on a second image on said display screen, such that said second image is visible through said partially transparent snippet image, and
    receiving, by said at least one electronic circuit, a selection of a second reference point on said second image corresponding to said first reference point on said first image; and
    aligning, by said at least one electronic circuit, said partially transparent snippet image and said second image by aligning said first reference point and said second reference point.

10. The system according to claim 9 wherein aligning comprises:
    moving said second image using said user interface to align said first reference point and said second reference point; and
    receiving an indication of alignment.

11. The system according to claim 10, wherein moving comprises translation and rotation of said second image.

12. The system according to claim 9, wherein aligning comprises:
moving said partially transparent snippet image using translation and rotation controls added to said user interface to align said first reference point and said second reference point; and
receiving an indication of alignment.

13. The system according to claim 9, wherein said user interface comprises a touch screen.

14. The system according to claim 9, wherein said device comprises a smart phone.

15. A method of aligning two map images, the method comprising:
displaying, by one or more electronic circuits, a first image comprising a user map image on the touch screen;
receiving, by the one or more electronic circuits, a selection of a first reference point on the user map image, using the touch screen;
generating, by the one or more electronic circuits, a partially transparent snippet image, wherein the partially transparent snippet image is a portion of the user map image centered on the first reference point and said snippet image is smaller than the user map image;
overlaying, by the one or more electronic circuits, the partially transparent snippet image on a digital map image on the touch screen, such that the second image is visible through the partially transparent snippet image;
receiving, by the one or more electronic circuits, a selection of a second reference point on the digital map image corresponding to the first reference point on the user map image;
aligning, by the one or more electronic circuits, the partially transparent snippet image and the second image by aligning the first reference point and the second reference point; and
receiving, by the one or more electronic circuits, an indication of acceptable alignment of the two map images.

16. The method of claim 15, further comprising:
displaying a user interface element to control a scale of the partially transparent snippet image and a user interface element to control a rotation of the partially transparent snippet image, the user interface elements displayed while the partially transparent snippet image is displayed on the digital map image.

17. The method of claim 16, further comprising:
displaying a user interface element to control a transparency of the partially transparent snippet image.

18. The method of claim 16, further comprising:
receiving a touch input directed to the digital map image and, in response to the touch input, panning or zooming the digital map image while the partially transparent snippet image is not panned or zoomed.

19. The method of claim 15, further comprising:
geo-locating a user by utilizing the geographical positioning system (GPS) of a GPS-enabled user device on the digital map image, wherein the digital map image does not include GPS coordinates.

\* \* \* \* \*